United States Patent Office 2,799,996
Patented July 23, 1957

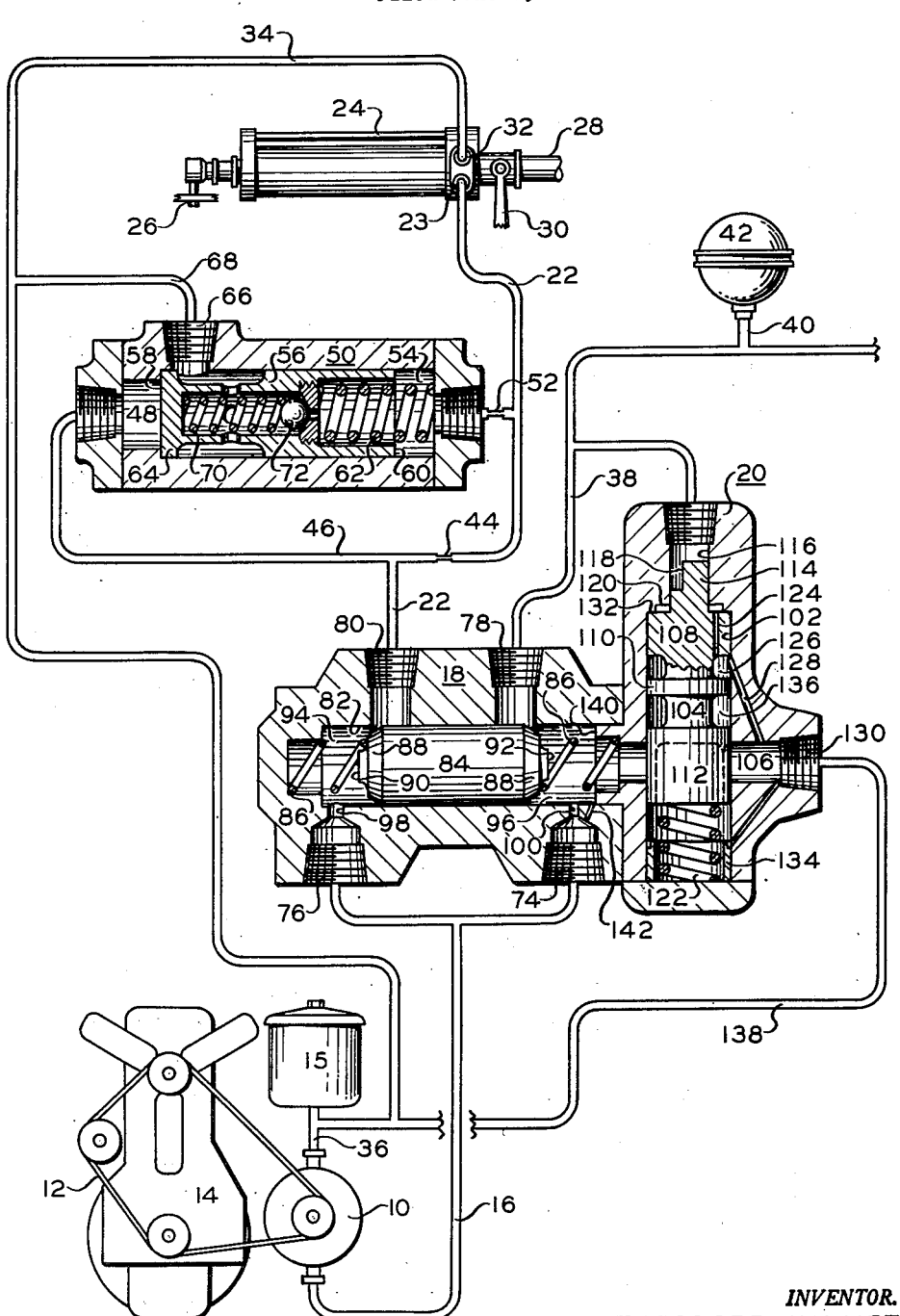

2,799,996
SINGLE PUMP, PLURAL MOTOR POWER TRANSMISSION

Theodore Van Meter, Oak Park, Mich., assignor to Vickers Incorporated, Detroit, Mich., a corporation of Michigan Application June 7, 1954, Serial No. 434,970

9 Claims. (Cl. 60—97)

This invention relates to power transmissions, and is particularly applicable to those of the type comprising two or more fluid pressure energy translating devices, one of which may function as a pump and another as a fluid motor.

More particularly the invention relates to such a power transmission in which a single pump is utilized to supply two or more fluid motors which are capable of simultaneous, independent operation.

A specific application for such a power transmission is in the field of fluid operated accessories for motor vehicles. One fluid motor might be in an open center power steering system while the other motor, or motors, might be in a closed center system for such uses as; adjustment of the driver's seat, actuation of windshield wipers, convertible top operations and window life actuation. The open center steering system requires a relatively constant supply of fluid whereas the other motors, being intermittently operated, may be supplied by an accumulator requiring only intermittent recharging.

Prior devices utilizing a single source and having means to proportion flow into the two systems have been bulky, costly and inefficient.

It is an object of this invention to provide an improved, low cost power transmission for the single source supply of two or more fluid motors.

Another object is to provide such a transmission in which power waste is minimized.

A further object is to provide improved means for controlling the charging of an accumulator.

It is also an object to provide a single source system for supplying fluid at a substantially constant rate to one branch circuit, while intermittently supplying fluid to another branch circuit.

Further objects and advantages of the present invention will be apparent from the following description, reference being had to the accompanying drawing wherein a preferred form of the present invention is clearly shown.

In the drawing the single figure shows a power transmission, embodying the present invention, as it might be applied to a motor vehicle for accessory actuation.

Referring to the drawing, there is shown a pump 10 which is driven by the fan belt 12 of an internal combustion engine 14 of a motor vehicle not shown. A fluid reservoir 15 is provided. Fluid delivered by pump 10 passes through a branched delivery conduit 16 to a flow dividing valve generally designated 18. Secured to one end of flow dividing valve 18 is a pilot control valve, generally designated 20. From the flow dividing valve 18 a first motor conduit 22 extends to the inlet port 23 of a steering booster 24. Booster 24 may be of the type described in the patent to Vickers, No. 2,022,698 and is fixed to the frame of the vehicle at 26, connected to the vehicle steering linkage by a rod 28 and controlled by a pitman arm 30. The booster return port 32 is connected by a conduit 34 to the pump inlet 36.

A second motor conduit 38 extends from the flow dividing valve 18 to communicate with the inlet 40 of an accumulator 42. Line 38 extends past the accumulator 42 to communicate with the other fluid motors not shown.

Motor conduit 22 has a restriction 44 therein. Pressure from upstream of restriction 44 is transmitted through a conduit 46 to a pressure chamber 48 at one end of a combination flow control and relief valve 50. A constricted conduit 52 affords communication between the conduit 22, at a point downstream from restriction 44, and a pressure chamber 54 of the valve 50. The valve spool 56 of valve 50 presents equal and opposed areas 58 and 60 to the pressure chambers 48 and 54, respectively. A spring 62 biases the valve spool 56 to a position wherein the land 64 isolates pressure chamber 48 from a discharge port 66. Discharge port 66 is connected through a conduit 68 with the return conduit 34 which, as heretofore noted, leads to the inlet 36 of pump 10.

The action of flow control valve 50 is to maintain the pressure drop across restriction 44 substantially constant, as it tends to exceed a predetermined maximum, and thus maintain a relatively constant flow to the steering booster 24. Whenever the pressure drop across restriction 44 tends to exceed an amount established by the load of spring 62, the pressure differential between chambers 48 and 54, reacting on the areas 58 and 60, will shift the spool 56 rightwardly. Fluid is thus diverted through the conduit 46 to conduit 68. As flow through restriction 44 tends to exceed the cracking point of valve 50, the valve spool 56 will continue to shift rightwardly thus diverting an increasing quantity of fluid and maintaining a substantially constant pressure drop across restriction 44.

Relief valve action of valve 50 is obtained when the pressure in chamber 54 exceeds an amount established by the spring 70 and lifts the valve 72 from its seat to vent chamber 54. Due to the constriction in passage 52, venting action by valve 72 causes a pressure drop in chamber 54 and the resulting unbalance between chambers 48 and 54, shifts valve 56 to vent the motor passage 22.

Flow dividing valve 18 includes a pair of inlet ports 74 and 76 to each of which is connected a branch of the delivery conduit 16. Motor ports 78 and 80 of the flow dividing valve 18 connect to the motor conduits 38 and 22 respectively. Ports 74, 76, 78 and 80 each communicate with a valve bore 82. A valve spool 84 in bore 82 is axially slidable therein, and the various ports are so arranged that movement of spool 84 in either direction will inversely affect communication between ports 76 and 80 and between ports 74 and 78. The valve spool 84 is freely slidable in bore 82, although a pair of very light centering springs 86 are provided. Tapers 88 are provided on the opposite ends of spool 84 to afford smoother and more accurate metering action. The valve spool 84 presents a pair of equal and opposed areas 90 and 92 to the pressure in chambers 94 and 96, respectively. Ports 76 communicates with pressure chamber 94 through a passage 98 having a cross section somewhat larger than the cross section of passage 100, through which port 74 communicates with pressure chamber 96.

Valve 84 is shiftable in response to a pressure differential across its ends and in shifting it tends to eliminate the movement initiating differential. For example, if the pressure in chamber 94 tends to exceed that in chamber 96, the net force on the effective areas 90 and 92 is such as to produce rightward movement of the valve spool 84. Rightward movement of valve 84 causes the right hand metering taper 88 to constrict communication between ports 74 and 78 while at the same time communication between ports 76 and 80 is made freer. The shifting of valve 84 tends to increase pressure in chamber 96 while decreasing that in chamber 94, thus maintaining their substantial equality. Since the pressure of the fluid supplied to port 74 and port 76 is the discharge pressure of pump 10 and since valve 84 shifts to maintain pressure in chambers 94 and 96 equal, equal pressure drops will exist across the passages 98 and 10. Due to the relative restrictive effect of passages 98 and 100, flow from the pump 10 will be divided between those passages in approximately the same ratio that the areas of those passages bear to each other. Thus the flow dividing valve 18 acts to proportion the discharge of pump 10 between the motor passage 22 and the motor passage 38 in any desired ratio, dependent on the cross sectional areas of passages 98 and 10.

The snap acting pilot valve 20 includes a valve bore 102 having a spool 104 axially shiftable therein. Bore 102 is intersected by a transverse passage 106 which extends across the bore 102 to communicate with the pressure chamber 96 of the flow dividing valve 18. Control valve 20 functions to vent the pressure chamber 96 in response to a predetermined maximum pressure in line 38 to cause the rightward shift of spool 84 and completely block communication between port 74 and port 78. Valve spool 104 has three lands thereon 108, 110, and 112 and includes a small diameter portion 114 which extends into the reduced diameter 116 of valve bore 102. The reduced portion 114 has a flat 118 thereon, which on movement of the valve is effective to establish communication between the reduced portion 116 and a pressure chamber 120 at the end of the larger diameter of the valve bore. A spring 122 biases the valve spool 104 to the position illustrated wherein the transverse passage 106 is blocked by valve land 112 and the small diameter portion 114 of valve spool 104 isolates passage 116 from the chamber 120. In the spring biased position illustrated, chamber 120 is vented to the pump inlet through a drilled passage 124 extending through the land 108 to an annular groove 126, which communicates with an angular drilled passage 128 leading to the outlet connection port 130. Thus in the normal spring biased position of valve spool 104, the pilot valve 20 does not affect the operation of flow dividing valve 18, which will proportion flow between conduits 22 and 38 as heretofore discussed. As accumulator 42 is charged, the increasing pressure in conduit 38 moves the valve spool 104 against spring 122 and at some predetermined pressure, for example, 1000 pounds per square inch, the flat 118 will establish communication between the small diameter 116 of valve bore 102 and the pressure chamber 120 to expose an additional annular area 132 to the accumulator pressure.

At the same time area 132 is subjected to pressure, the land 108 interrupts communication between chamber 120 and the drilled passage 128. The additional force thus exerted on spool 104 will snap the spool to a position established by abutment of the end of the spool and the annular spacer 134. In this position the annulus 136 vents the pressure chamber 96 through conduit 138 to the pump inlet. The resulting pressure drop in chamber 96 causes rightward shifting of the spool 84 of the flow dividing valve 18 and this shift will continue until the right end of spool 84 abuts the stop 140. In its extreme rightward position, spool 84 completely blocks port 78 and also covers passage 100. A very small bleed hole 142 maintains a highly restricted communication between the port 74 and pressure chamber 96.

Because of the added area 132 subjected to accumulator pressure on shifting of the valve spool 104 the accumulator pressure must drop to some value considerably lower than 1000 pounds per square inch, for example 800 pounds per square inch, before the valve spool 104 will return to the spring biased position illustrated. On return of the valve spool 104 to the spring biased position, land 112 will again block passage 106 and the fluid metered through bleed hole 142 will return the spool 84 to the metering position wherein it again proportions flow between the conduits 22 and 38. Valve 20 is representative of several arrangements controllable by accumulator pressure differential which could be utilized to vent pressure chamber 96.

In operation, with the accumulator in a discharged condition, the flow dividing valve 18 will proportion the fluid discharged by pump 10 into the conduits 22 and 38. All of the fluid delivered to conduit 22 will pass through the steering booster 24 until the pressure drop across restriction 44 exceeds a predetermined maximum at which time flow control valve 50 becomes effective to divert excess flow from the conduit 22. A portion of the pump discharge will continue to be delivered through flow dividing valve 18 to the conduit 38 until the pressure in that conduit reaches the predetermined maximum established by the spring 122. At that time valve spool 104 will shift as heretofore discussed to vent pressure chamber 96 thus causing complete rightward shift of the spool 84 of flow dividing valve 18 thus completely blocking port 78 and passage 100. When spool 84 is in the rightward position blocking passage 100 the entire capacity of pump 10, less the small amount metered through bleed hole 142, will be discharged through the flow dividing valve 18 from port 76 to port 80 and thus be available to supply steering booster 24. At all but extremely low speeds of the vehicle engine the complete discharge of the pump 10 will exceed the desired rate of supply to the steering booster 24, as established by the flow control valve 50, and valve 50 will function to bypass the excess fluid to the pump inlet. Further, the excess fluid is by-passed at the relatively low operating pressure of the steering booster branch of the circuit.

There has thus been provided an improved, low cost, and efficient single source system for supplying pressure fluid to a plurality of independently operable fluid motors.

While the form of embodiment of the invention as herein disclosed constitutes a preferred form, it is to be understood that other forms might be adopted, all coming within the scope of the claims which follow.

What is claimed is as follows:

1. In a single source hydraulic system, the combination of: a pair of fluid consuming devices; separate passage means extending to each of said devices; flow dividing valve means to proportion fluid from said source between said separate passage means; and means responsive to the pressure in one of said separate passages for inducing shift of said flow dividing valve to block said one passage and thus divert substantially the entire output of said source into the other of said passages.

2. In a single source hydraulic system, the combination of: a pair of fluid consuming devices; separate passage means extending to each of said devices; flow dividing valve means to proportion fluid from said source between said separate passage means; means responsive to the pressure in one of said separate passages for inducing shift of said flow dividing valve to block said one passage and thus divert substantially the entire output of said source into the other of said passages; and flow regulating valve means in said other passage to control the flow rate therein.

3. In a single source hydraulic system, the combination of: a pair of fluid consuming devices, one being an accumulator; separate passage means extending to each of said devices; flow dividing valve means to proportion fluid from said source between said separate passage means; and means responsive to the pressure in that one passage extending to said accumulator for inducing shift of said flow dividing valve to block said one passage and thus divert substantially the entire output of said source into the other of said passages.

4. In a single source hydraulic system, the combination of: a pair of fluid consuming devices, one being an accumulator; separate passage means extending to each of said devices; flow dividing valve means to proportion fluid from said source between said separate passage means; means responsive to the pressure in that one passage extending to said accumulator for inducing shift of said flow dividing valve to block said one passage and thus divert substantially the entire output of said source into the other of said passages; and flow regulating valve means in said other passage to control the flow rate therein.

5. In a single source hydraulic system, the combination of: a pair of fluid consuming devices, one being an accumulator; separate passage means extending to each of said devices; flow dividing valve means to proportion fluid from said source between said separate passage means; means responsive to the pressure in that one passage extending to said accumulator for inducing shift of said flow dividing valve to block said one passage and thus divert substantially the entire output of said source into the other of said passages; and flow regulating valve means in said other passage responsive to increasing flow therein to divert fluid therefrom and thus control the flow rate therein.

6. In a single source hydraulic system for operating a plurality of fluid motors, the combination of: means forming a pair of fluid passages, each connectable between the source and one of said motors; a fixed restriction in each passage; flow dividing valve means downstream from the restrictions and having a pair of opposed areas each exposed to pressure in one of said passages, said valve means being shiftable in response to a pressure differential in the passages to maintain a predetermined relation between the pressure drops across said restrictions, thereby to proportion flow in the two pasages; and means responsive to the pressure in one of said passages to control said differential pressure and thus effect shifting of said valve means to block said one passage and divert substantially the entire output of said source into the other of said passages.

7. In a single source hydraulic system for operating a plurality of fluid passages, the combination of: means forming a pair of fluid passages, each connectable between the source and one of said motors; a fixed restriction in each passage; flow dividing valve means downstream from the restrictions and having a pair of opposed areas each exposed to pressure in one of said passages, said valve means being shiftable in response to a pressure differential in the passages to maintain a predetermined relation between the pressure drop across said restrictions, thereby to proportion flow in the two passages, means responsive to the pressure in one of said passages to control said differential pressure and thus effect shifting of said valve means to block said one passage and divert substantially the entire output of said source into the other of said passages; and flow regulating valve means in said other passage to control the flow rate therein.

8. In a single source hydraulic system for operating a plurality of fluid motors, the combination of: means forming a pair of fluid passages, each connectable between the source and one of said motors; an accumulator in one of said passages; a fixed restriction in each passage; flow dividing valve means downstream from the restrictions and having a pair of opposed areas each exposed to pressure in one of said passages, said valve means being shiftable in response to a pressure differential in the passages to maintain a predetermined relation between the pressure drops across said restrictions, thereby to proportion flow in the two passages; and means responsive to the pressure in that one passage having the accumulator therein to control said differential pressure and thus effect shifting of said valve means to block said one passage and divert substantially the entire output of said source into the other of said passages.

9. In a single source hydraulic system for operating a plurality of fluid motors, the combination of: means forming a pair of fluid passages, each connectable between the source and one of said motors; an accumulator in one of said passages; a fixed restriction in each passage; flow dividing valve means downstream from the restrictions and having a pair of opposed areas each exposed to pressure in one of said passages, said valve means being shiftable in response to a pressure differential in the passages to maintain a predetermined relation between the pressure drops across said restrictions, thereby to proportion flow in the two passages; means responsive to the pressure in that one passage having the accumulator therein to control said differential pressure and thus effect shifting of said valve means to block said one passage and divert substantially the entire output of said source into the other of said passages; and flow regulating valve means in said other passage to control the flow rate therein.

References Cited in the file of this patent
UNITED STATES PATENTS

| | | |
|---|---|---|
| 1,999,834 | Ernst | Apr. 30, 1935 |
| 2,266,921 | Trautman | Dec. 23, 1941 |